HUGH J. HAGEMEYER, JR.
MAX STATMAN
HERSCHEL T. VINYARD
INVENTORS

ATTORNEY 3,586,485
REACTOR PACKING
Hugh J. Hagemeyer, Jr., Max Statman, and Herschel T. Vinyard, Longview, Tex., assignors to Eastman Kodak Company, Rochester, N.Y.
Original application Feb. 25, 1966, Ser. No. 530,023, now Patent No. 3,442,933, dated May 6, 1969. Divided and this application Dec. 19, 1968, Ser. No. 785,119
Int. Cl. C01b *31/36;* B01j *9/02*
U.S. Cl. 23—252                1 Claim

ABSTRACT OF THE DISCLOSURE

Silicon carbide packing elements which have been pretreated with nitric acid improve reactor heat transfer and reduce carbonization in chemical processes, particularly in oxidative dehydrogenation processes for the production of unsaturated organic compounds such as styrene and methyl methacrylate.

---

Figure 1:
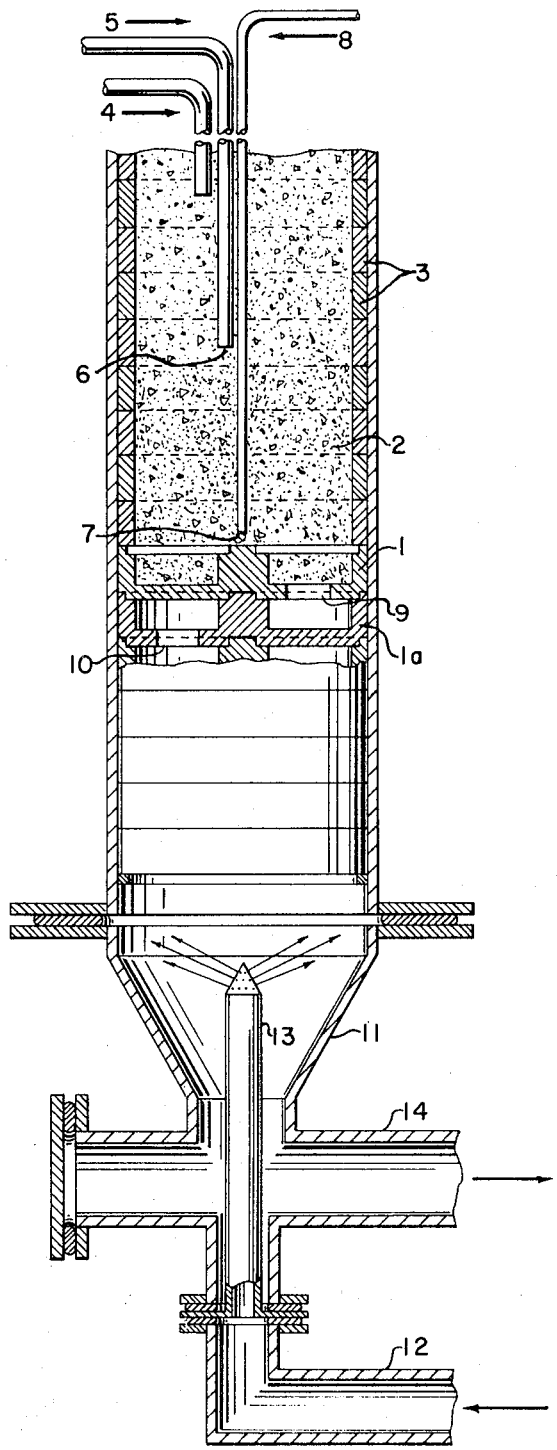

This application is a divisional application of copending application Ser. No. 530,023, filed Feb. 25, 1966 now Pat. No. 3,442,933.

This invention relates to chemical processes of the type wherein organic compounds are heated in a reactor under oxidative conditions and particularly to oxidative dehydrogenation processes.

A number of oxidation processes are advantageously carried out in reactors packed with siliceous elements such as glass, silica, or silicon carbide elements which are substantially inert under oxidative conditions. In particular, good results are obtainable using commercial grade silicon carbide elements. For example, a minimum amount of carbonization takes place in a reactor random-packed with pieces of silicon carbide. However, the carbonization may be appreciable and eventually cause poor heat transfer to be obtained. The reactor may even plug up requiring that it be shut down for replacement of the silicon carbide elements.

The carbonization taking place on the silicon carbide elements is due to the presence of an oxidation catalyst. Apparently, the oxidation catalyst is not free silica or carbon. We have discovered that the oxidation catalyst can be inactivated by treating the silicon carbide elements with nitric acid and when the elements thus treated are used in the oxidation processes, carbonization in the reactor is substantially reduced and good heat transfer can be maintained in the reactor over a long period of time.

The nitric acid treatment of the silicon carbide reactor elements is especially advantageous when the elements are used in a reactor designed for the oxidative dehydrogenation processes for the production of unsaturated organic compounds. In these processes, an organic compound such as methyl isobutyrate is dehydrogenated to obtain methyl methacrylate by heating the organic compound in the presence of oxygen and an iodine species such as iodine, hydrogen iodide or an organic iodine compound, for example, as described in the Kalb U.S. Patent 2,719,171 and in the Blood et al. U.S. Patent application Ser. No. 388,196 filed Aug. 7, 1964, now abandoned. When silicon carbide elements are not treated with nitric acid, i.e., elements in the form of random packing, cylindrical sleeves or circular plate members described below, are used in a reactor in these oxidation processes, substantial undesirable carbonization takes place during the production of the unsaturated organic compound. However, when the silicon carbide elements have been pretreated with nitric acid, carbonization is greatly reduced and good heat transfer can be maintained in the reactor over a long period of time. The treatment with nitric acid can be carried out by placing the silicon carbide elements in concentrated nitric acid followed by washing to remove substantially all of the nitric acid, the treatment being carried out until carbonization in the oxidation processes is materially decreased. The nitric acid treatment of the silicon carbide elements may be carried out for about 4 to 24 hours at a temperature in the range of about 10° C. to about 90° C., preferably about 20° C. to about 35° C. In some cases the shorter periods of treatment with nitric acid can be used but may give only partial deactivation of the sites of catalytic oxidation. Treatment for about 24 hours or longer gives generally complete deactivation of the silicon carbide elements.

The silicon carbide elements useful in our invention are those prepared in known manner by molding the commercial grade of silicon carbide preferably containing a small amount of organic or inorganic binder and heating to form a dense coherent mass. Minor amounts of aluminum and aluminum compounds such as aluminum oxides and aluminum carbides may be present.

Figure 2:
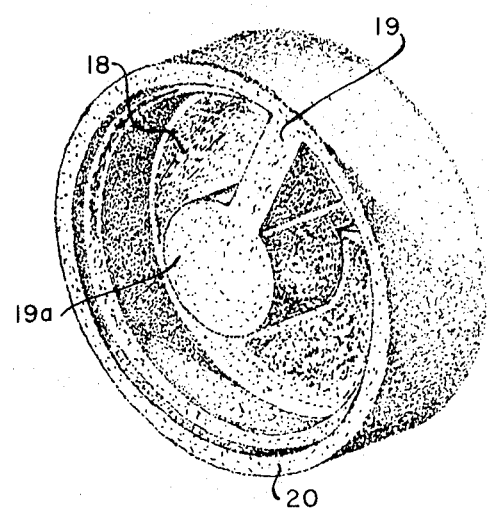
Figure 3:
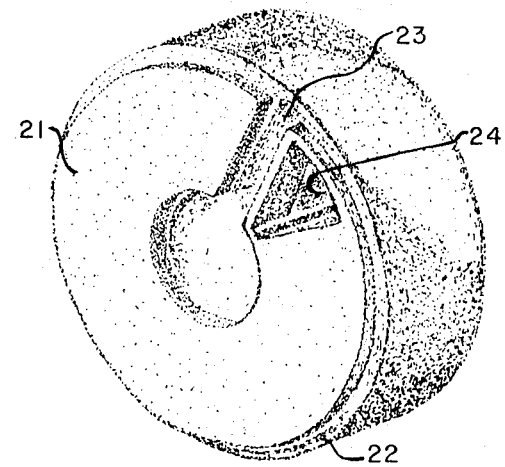

The accompanying drawings shown in FIG. 1 depict the appearance of a reactor tower and quench chamber particularly useful in oxidation processes and containing silicon carbide elements treated with nitric acid so as to deactivate the catalytic oxidation sites. FIG. 2 and FIG. 3 show two views of circular silicon carbide plate members useful in the reactor tower to obtain increased linear velocity and heat transfer.

The following examples will serve to illustrate the use of the nitric acid treatment process for the preparation of silicon carbide elements for particular use in oxidation processes, such as the oxidative dehydrogenation processes for the production of unsaturated organic compounds.

EXAMPLE 1

A reactor was used having a stainless steel shell containing formed silica packing. The upper part of the reactor was at a temperature of about 200° C. and the lower part at about 600° C. A mixture of methyl isobutyrate and 40% aqueous hydrogen iodide hydrate solution preheated to 200° C. was passed into the reactor at a temperature zone where the temperature was 400° to 450° C. At this temperature zone, sufficient air was also introduced to obtain a mixture of methyl isobutyrate and oxygen in the molar ratio of 4:1 by weight. The mixture was then passed down the reactor column to the temperature zone of 600° C. and out the bottom of the reactor where the hot effluent was quickly quenched with chilled scrub water. The quenched effluent passed into a decanter where an upper layer containing methyl methacrylate separated and was recovered. The non-condensible off-gas was drawn off and analyzed for carbon dioxide content. As a result, about 80% recovery of the organic compounds comprising methyl methacrylate was obtained and the off-gas contained 13% carbon dioxide.

EXAMPLE 2

The stainless steel reactor used above containing cylindrical silicon carbide sleeves fitting close to the reactor shell was packed with broken pieces of commercial grade silicon carbide. The reactor was operated as described in Example 1 except using 20% aqueous hydrogen iodide hydrate catalyst fed at a rate such that 3% hydrogen iodide was present based upon the methyl isobutyrate in the reaction zone. The molar ratio of methyl isobutyrate to oxygen was about 6:1. As a result, about 80–90% of the organic compounds comprising methyl methacrylate was recovered and 7% carbon dioxide was present in the off-gas.

EXAMPLE 3

The process of Example 2 was repeated, except that the silicon carbide sleeves and the random packing of silicon carbide had been pretreated with concentrated nitric acid for 24 hours, followed by washing for 12 hours. Ninety-five percent recovery of the organic compounds resulted and 7% carbon dioxide was present in the off-gas. Little carbonization was obtained in the reactor and good heat transfer could be maintained in continuous operation of the process.

EXAMPLE 4

This example illustrates the operation of an oxidative dehydrogenation process wherein the reactor is provided with a stack of nitric acid-treated silicon carbide plates of a design especially adapted to produce low carbonization, high linear velocity and high heat transfer in the reactor. As shown in FIG. 1 the reactor tower comprises a shell preferably of stainless steel, the lower part of the tower containing, for illustration, seven circular silicon carbide plates fitting close to the reactor wall, such as plates 1 and 1a, the upper part of the tower being random-packed with pieces of silicon carbide 2. Cylindrical silicon carbide sleeves 3 isolate the packing from the walls of the reactor. The appearance of a representative circular plate member 1 is shown in FIG. 2 and FIG. 3. In FIG. 2 the plate is shown from the side having a sector of an annular depression 18 forming a radial tenon 19, hub 19a, and a rim with a circular lip 20. FIG. 3 is a view from the opposite side of the plate showing the sector of an annular extension 21 forming a peripheral shoulder 22 and a radial mortise 23, the latter being angularly displaced from the tenon, for example by about 70 degrees, and an aperture 24 is arranged between one end of the depression and the other corresponding end of the extension, the mortise and tenon cooperating with mating parts on adjacent plate members 1 and 1a when in stack relation for interlocking the members and for angularly displacing the aperture relative to the aperture in an adjacent member. Accordingly, when a media is introduced from zone 7 into the annular depression of plate 1, it flows through aperture 9 into the annular depression of plate 1a, and in an arcuate path in the depression and out of aperture 10 and similarly in a spiral path down through the other plates of the reactor. The silicon carbide elements 1, 1a, 2 and 3 were treated with nitric acid followed by washing as described above.

In a representative oxidative dehydrogenation process streams of preheated methyl isobutyrate and hydrogen iodide hydrate (20%) are fed into the reactor through lines 4 and 5 respectively, mixing at zone 6 where the temperature is about 350° C. The mixture then passes on down through the reactor to zone 7 which is at a temperature of from 500° to 650° C. where a stream of air enters through line 8 and mixes with the methyl isobutyrate and hydrogen iodide hydrate. The molar ratio of methyl isobutyrate to oxygen is about 6:1. The mixture then passes through aperture 9 of plate 1 into the annular depression of plate 1a out of aperture 10 and in a spiral path down through plate 1a and the underlying plate numbers, the hot effluent being quenched in chamber 11 by chilled quench fluid from line 12 being sprayed on the walls of the chamber through nozzle 13. The cooled product stream passes out of the quench chamber through line 14 for separation of the methyl methacrylate from unreacted methyl isobutyrate and excess hydrogen iodide hydrate. Continuous operation of the reaction containing the nitric acid-treated silicon carbide elements in the manner described shows that there is little tendency towards carbonization. The recovery of organic products was at least 95% and about 5 to 7% carbon dioxide was present in the off-gas.

The process of this example can be carried out in a similar manner, for example substituting ethyl benzene for methyl isobutyrate for preparing styrene. Organic compounds containing an alkyl chain of at least two carbon atoms, especially lower esters of lower aliphatic acids of at least three carbon atoms, e.g., methyl isobutyrate are especially useful in the process.

EXAMPLE 5

The oxidative dehydrogenation process described in U.S. Pat. 2,719,171, utilizing iodine for the dehydrogenation of organic compounds, is carried out in the apparatus shown in FIG. 1 by introducing a stream of methyl isobutyrate containing 2% by weight of iodine through line 4 and air through line 8, the upper part of the reactor being heated to about 350° C. and the lower part, in the region of the circular plate members being at about 650° C. The ratio of air to methyl isobutyrate is such as to give about 0.5 mole of oxygen per mole of methyl isobutyrate. The mixture is passed through the reactor and quenched as described in Example 4. The quenched product stream contains methyl methacrylate, methyl acrylate, methyl isobutyrate and iodine. Continuous operation of this process over a period of time shows that the use of the nitric acid-treated silicon carbide elements in the reactor reduces the tendency for carbonization.

The invention has been described in considerable detail with particular reference to certain preferred embodiments thereof, but it will be understood that variations and modifications can be effected within the spirit and scope of the invention as described hereinabove.

We claim:

1. A reactor packing material prepared by pretreatment of preformed commercial grade silicon carbide elements, the pretreatment comprising soaking the commercial grade silicon carbide elements in nitric acid for at least about 4 hours and rinsing to remove excess nitric acid, wherein said preformed commercial grade silicon carbide elements comprises a circular silicon carbide plate, said plate having on one side an annular depression forming a radial tenon, a hub and a circular lip, and on the other side a sector of an annular extension forming a peripheral shoulder and radial mortise angularly displaced from said tenon and an aperture arranged between one end of the depression and the other end of the extension.

References Cited

UNITED STATES PATENTS

| | | | |
|---|---|---|---|
| 2,996,783 | 8/1961 | Mayer | 23—208(AX) |
| 3,035,325 | 5/1962 | Nicholson et al. | 23—208(AX) |
| 3,350,182 | 10/1967 | Hunter et al. | 23—208(AX) |
| 3,175,884 | 3/1965 | Kuhn | 23—208"A" |
| 3,442,933 | 5/1969 | Hagemeyer et al. | 23—208"A" |
| 3,466,149 | 9/1969 | Blood et al. | 261—94X |
| 3,466,149 | 9/1969 | Blood et al. | 26—194X |

JAMES H. TAYMAN, Jr., Primary Examiner

U.S. Cl. X.R.

23—208; 252—443; 260—486; 261—94